US010164835B2

(12) United States Patent
Ganesan et al.

(10) Patent No.: US 10,164,835 B2
(45) Date of Patent: Dec. 25, 2018

(54) ACCESSING PERIPHERAL DEVICES FROM A CONTAINER WITHIN VIRTUAL MACHINES RUNNING ON DIFFERENT HOST COMPUTING SYSTEMS

(71) Applicant: VMWARE, INC., Palo Alto, CA (US)

(72) Inventors: Hariharan Jeyaraman Ganesan, Bangalore (IN); Jinto Antony, Bangalore (IN); Madhusudhanan Gangadharan, Bangalore (IN); Smitha Radhakrishnan, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 246 days.

(21) Appl. No.: 15/291,090

(22) Filed: Oct. 12, 2016

(65) Prior Publication Data

US 2017/0366405 A1 Dec. 21, 2017

(30) Foreign Application Priority Data

Jun. 17, 2016 (IN) .............................. 201641020792

(51) Int. Cl.
| *H04L 12/24* | (2006.01) |
| *H04L 12/26* | (2006.01) |
| *H04L 29/08* | (2006.01) |
| *G06F 9/455* | (2018.01) |
| *G06F 9/50* | (2006.01) |

(52) U.S. Cl.
CPC ...... *H04L 41/0896* (2013.01); *G06F 9/45558* (2013.01); *G06F 9/5011* (2013.01); *H04L 43/16* (2013.01); *H04L 67/10* (2013.01); *G06F 2009/4557* (2013.01); *G06F 2009/45579* (2013.01)

(58) Field of Classification Search
CPC ..... H04L 41/0896; H04L 67/10; H04L 43/16; G06F 9/5011; G06F 9/45558; G06F 2009/45579; G06F 2009/4557
See application file for complete search history.

(56) References Cited

U.S. PATENT DOCUMENTS 9,830,566 B1 * 11/2017 Dailianas ........... G06Q 10/0631
2003/0227568 A1 * 12/2003 Stahl ...................... H04B 1/205
348/552

(Continued)

*Primary Examiner* — Michael A Keller
(74) *Attorney, Agent, or Firm* — Patterson & Sheridan, LLP

(57) ABSTRACT

A method to enable container access to a peripheral device, where the container is hosted by a virtual machine running in a first host and the peripheral device is directly connected to a second host, is provided. The method includes determining a bandwidth requirement of the peripheral device, and comparing the bandwidth requirement of the peripheral device to bandwidth allocated to the virtual machine that is hosting the container. If the bandwidth requirement of the peripheral device is higher than a threshold percentage of the bandwidth allocated to the virtual machine, the virtual machine is migrated from the first host computer to the second host computer. On the other hand, if the bandwidth requirement of the peripheral device is lower than the threshold percentage of the bandwidth allocated to the virtual machine, processes are launched to establish a network channel by which the container communicates with the peripheral device.

17 Claims, 7 Drawing Sheets

(56) References Cited

U.S. PATENT DOCUMENTS

| | | | |
|---|---|---|---|
| 2007/0078988 A1* | 4/2007 | Miloushev | G06F 9/485 709/227 |
| 2007/0208848 A1* | 9/2007 | Bhesania | G06F 3/0625 709/224 |
| 2009/0222558 A1* | 9/2009 | Xu | G06F 9/485 709/224 |
| 2009/0222610 A1* | 9/2009 | Yamazaki | G06F 13/28 710/308 |

* cited by examiner

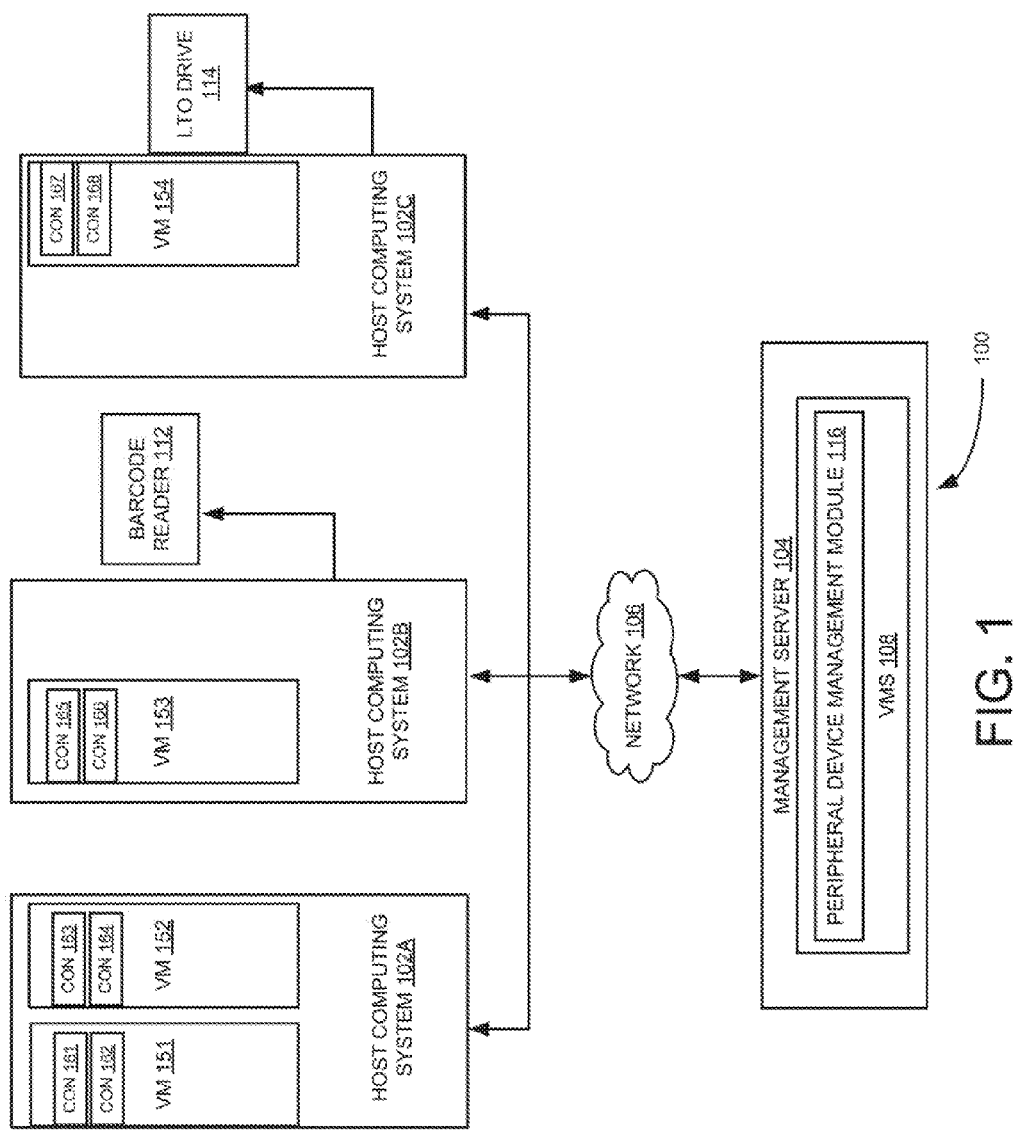

| DEVICE ID 502 | DEVICE NAME | HOST ATTACHED TO 504 | TYPE | DEVICE BANDWIDTH | CURRENTLY USED (YES/NO) | REMOTE ACCESS (YES/NO) | HOST N/W SPEED | BANDWIDTH ALLOCATED to VM | ESTIMATED ACCESS DURATION | AUTHENTICATION REQUIRED |
|---|---|---|---|---|---|---|---|---|---|---|
| 1 | LTO | H1 | IDE | 2 GBPS | NO | YES | 1GBPS | 600 MBPS | 2 HR | YES |
| 2 | SSD | H2 | USB | 3 GBPS | YES | NO | 1GBPS | 1 GBPS | 30 MIN | NO |
| 3 | BARCODE READER | H3 | SCSI | 100 MBPS | NO | YES | 1GBPS | 800 MBPS | 1 HR | NO |
| 4 | | | | | | | | | | |
| 5 | | | | | | | | | | |
| 6 | | | | | | | | | | |
| 7 | | | | | | | | | | |

ACCESSING PERIPHERAL DEVICES FROM A CONTAINER WITHIN VIRTUAL MACHINES RUNNING ON DIFFERENT HOST COMPUTING SYSTEMS

BACKGROUND

Computer virtualization is a technique that involves encapsulating a physical computing machine platform into virtual machine(s) executing under control of virtualization software on a hardware computing platform or "host." A virtual machine provides virtual hardware abstractions for processor, memory, storage, and the like to a guest operating system. The virtualization software, also referred to as a "hypervisor," includes one or more virtual machine monitors (VMMs) to provide execution environment(s) for the virtual machine(s). As physical hosts have grown larger, with greater processor core counts and terabyte memory sizes, virtualization has become key to the economic utilization of available hardware.

Virtual machines provide hardware-level virtualization. Another virtualization technique is operating system-level (OS-level) virtualization, known as a "container," where an abstraction layer is configured using the kernel of an operating system executing on a host computing system. A container runs as an isolated process in user-space on the host operating system (referred to as the "container host") and shares the kernel with other containers. A container relies on the kernel's functionality in order to run applications therewithin with certain resource constraints (e.g, a certain amount of memory or processing time) and isolation.

Host computing systems on which VMs are running may be configured to operate with one or more peripheral devices. Such devices may include, for example, input devices (e.g., a keyboard, a mouse, a graphic tablet, a touch screen, an image scanner, a microphone, a webcam, and a barcode reader), output devices (e.g., a display device, a printer, and a graphical output device), storage devices (e.g., an external hard drive, an LTO drive, a flash drive/solid-state drive, a disk drive commonly within a hard drive enclosure, a smartphone or tablet computer storage interface, a CD-ROM drive, and a DVD-ROM drive) and input and output devices (e.g., a modem and a network interface controller). Each such peripheral device requires host computing system resources, such as processor (CPU) time, input/output (I/O) bandwidth on the various data buses, and physical memory space.

Typically, when a peripheral device is attached to a host computing system, the peripheral device is not available to VMs that are configured to run on a different host computing system in the cluster. In addition, if containers are configured to run within the VMs, such containers will also not be able to access the peripheral device.

SUMMARY

One embodiment provides a method of providing access to a peripheral device for a container hosted by a virtual machine that is running in a first host computer, wherein the peripheral device is directly connected to a second host computer. The method includes the step of determining a bandwidth requirement of the peripheral device, comparing the bandwidth requirement of the peripheral device to bandwidth allocated to the virtual machine that is hosting the container. If the bandwidth requirement of the peripheral device is higher than a threshold percentage of the bandwidth allocated to the virtual machine that is hosting the container, the virtual machine is migrated from the first host computer to the second host computer. On the other hand, if the bandwidth requirement of the peripheral device is lower than or equal to the threshold percentage of the bandwidth allocated to the virtual machine, processes are launched to establish a network channel by which the container communicates with the peripheral device. Alternatively, if the container is stateless, instead of migrating the virtual machine, a second container that is identical to the first container is provisioned in a virtual machine that is running in the second host computer and the first container is de-provisioned.

Further embodiments include, without limitation, a non-transitory computer-readable storage medium that includes instructions for a processor to carry out the above method, and a computer system that includes a processor programmed to carry out the above method.

BRIEF DESCRIPTION OF THE DRAWINGS

FIG. 1 is a block diagram depicting a computing system according to an embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 2A:
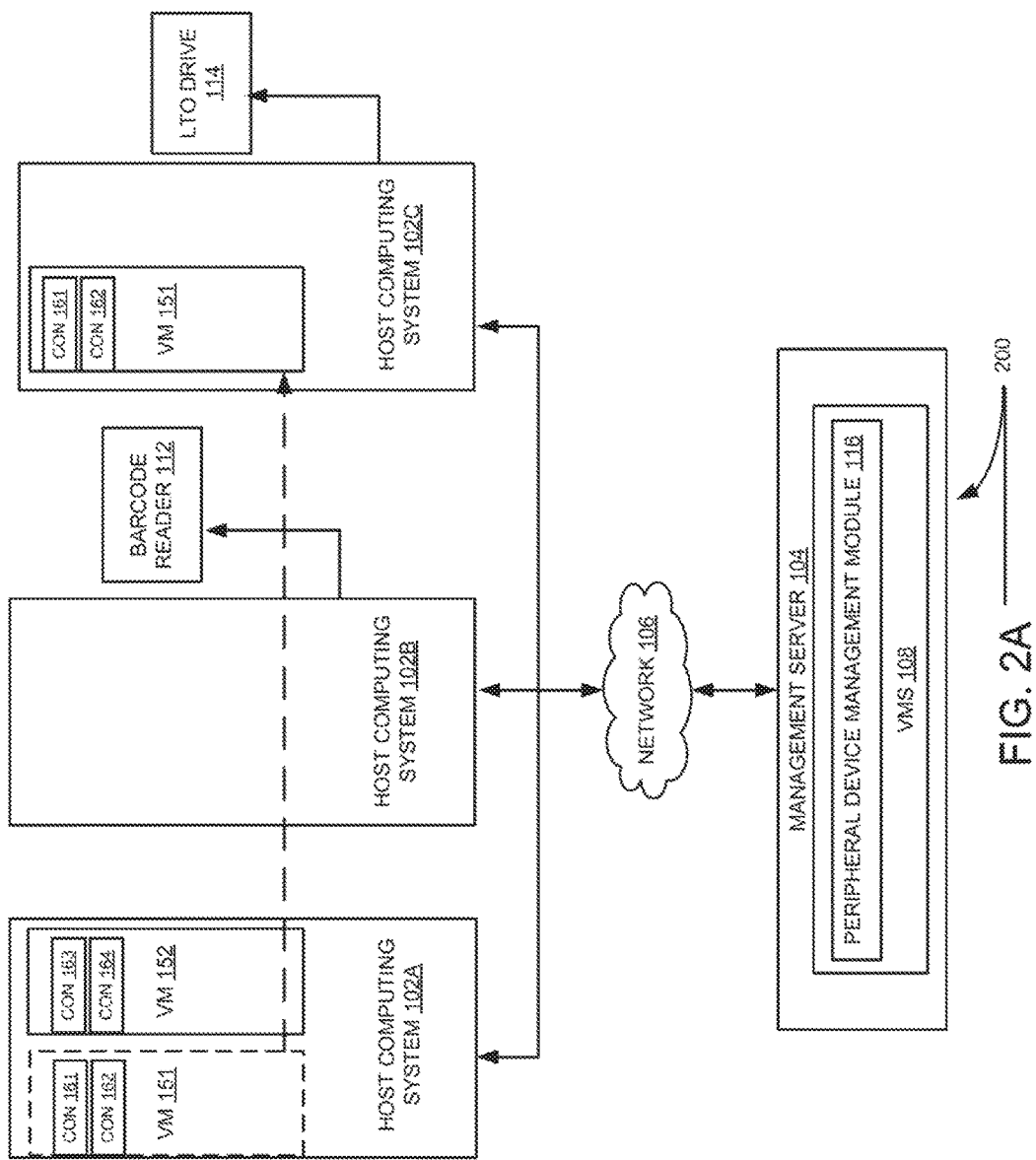
FIG. 2A is a conceptual diagram depicting an embodiment of a virtualized computing system.

FIG. 1 is a block diagram depicting a computing system 100 according to an embodiment. Host computing systems 102A-C are depicted, having associated VMs running therein. VMs 151 and 152 run inside host computing system 102A, VM153 runs inside host computing system 102B, and VM 154 runs inside host computing system 102C. Furthermore, each of the VMs can have one or more containers running therein. VM 151 is hosting containers 161 and 162, VM 152 is hosting containers 163 and 164, VM 153 is hosting containers 165 and 166, and VM 154 is hosting containers 167 and 168. In one embodiment, each of containers 161-168 is as an isolated process running in user-space on a guest operating system of the VM that is hosting the container.

Furthermore, host computing systems 102A-C are connected to each other via system bus and in the example shown in FIG. 1, barcode reader 112 is connected to host computing system 102B and LTO drive 114 is connected to host computing system 102C. Embodiments described herein implement different techniques to enable any of containers 161-168 to access and share the peripheral devices even though the container may not be hosted by a VM that is running on a host computing system connected to the peripheral devices.

As further shown in FIG. 1, host computing systems 102A-C are operatively coupled to management server 104 through a network 106. Management server 104 includes virtual machine management software (VMMS) 108 configured to communicate with host computing systems 102A-C to perform management functions. One example of a VMMS is vCloud Air®, which is commercially available from VMware, Inc. of Palo Alto, Calif., although the teachings herein may be utilized with any other virtualization technologies as well.

Figure 2B:
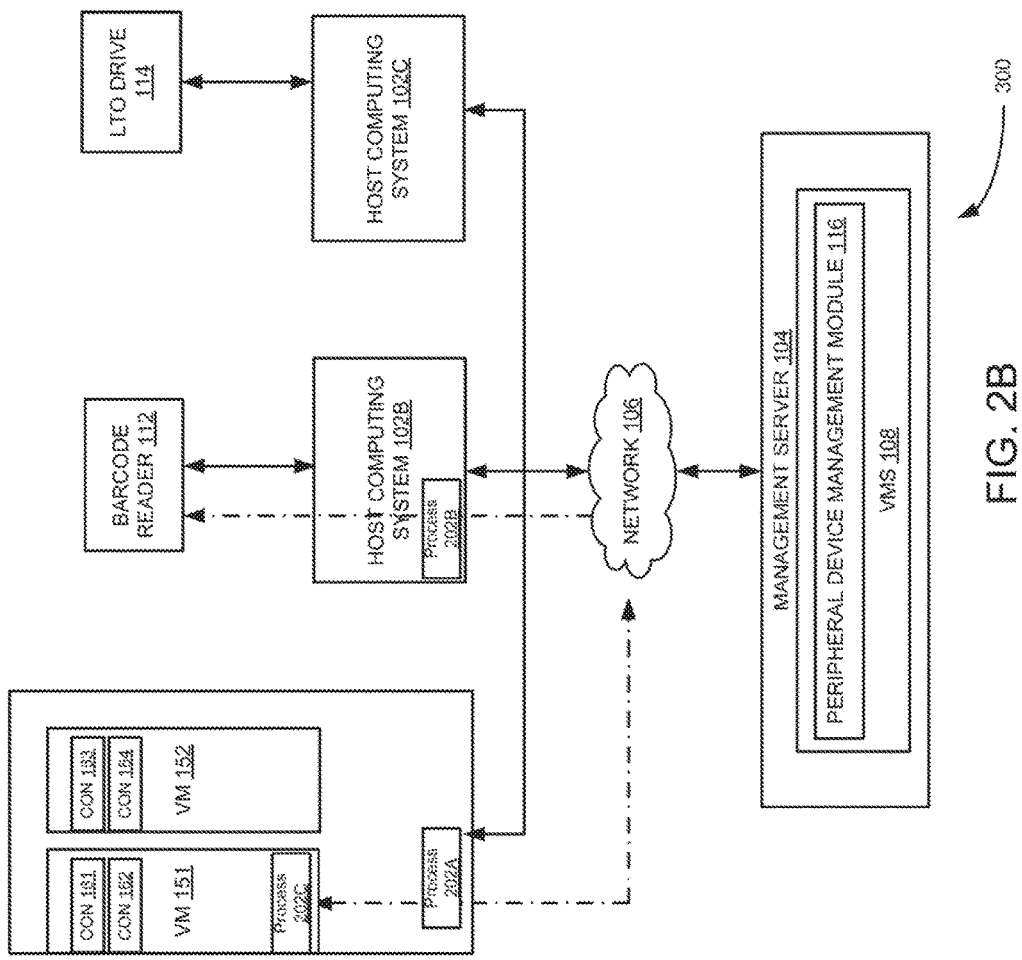
FIG. 2B is a conceptual diagram depicting another embodiment of a virtualized computing system.

The VMMS 108 includes peripheral device management module 116 which monitors peripheral devices and determines when a container requires or is requesting access to a peripheral device that is not local to the VM hosting the container (hereinafter referred to as "remote peripheral device"). Peripheral device management module 116 also determines the bandwidth requirement associated with each particular peripheral device. A peripheral device's bandwidth requirement can be determined by accessing a look-up table or other data structure storing the peripheral device's bandwidth, or by querying the peripheral device directly. An example of a peripheral device bandwidth lookup table is provided in table 500 in FIG. 5, discussed in greater detail below. Table 500 also stores information about the network bandwidth allocated to each of the VMs so that peripheral device management module 116 can determine how configure access by a container to a remote peripheral device. If the network bandwidth requirement of a peripheral device is greater than the network bandwidth allocated to the VM, peripheral device management module 116 configures access by migrating the VM to the host associated with the peripheral device as illustrated in FIG. 2A. If the network bandwidth requirement of a peripheral device is lower than the network bandwidth allocated to the VM, the peripheral device management module 116 configures access by providing a process to enable remote network access as illustrated in FIG. 2B. If the container requesting access is a stateless container, the peripheral device management module116 configures access by provisioning a new container on the host having the peripheral device, as illustrated in FIG. 2C.

In the example depicted in FIG. 2A, container 161 running within VM 151, which is running in host computing system 102A, requested access to LTO drive 114, which is connected to host computing system 102C. Responsive to this request, peripheral device management module 116 examines the bandwidth requirements of LTO drive 114 and compares this bandwidth requirement to a threshold percentage of the network bandwidth allocated to VM 151. For example, the threshold percentage can be programmatically set to 10% of the bandwidth allocated to VM 151. Because the bandwidth requirements of LTO drive 114 are determined to be higher than the bandwidth allocated to VM 151, peripheral device management module 116 initiates a process to migrate VM 151 to host computing system 102C. After the migration, container 161 is able to access LTO drive 114 directly.

In the example depicted in FIG. 2B, container 161 running within VM 151, itself running on host computing system 102A, requested access to barcode reader 112, which is connected to host computing system 102B. Responsive to this request, peripheral device management module 116 examines the bandwidth requirements of barcode reader 112 and compares this bandwidth requirement to a threshold percentage of the network bandwidth allocated to VM 151. Because the bandwidth requirements of barcode reader 112 are determined to be lower than the bandwidth allocated to VM 151, peripheral device management module 116 starts process 202A in host computing system 102A, process 202B in host computing system 102B, and process 202C in VM 151. The processes 202A-C run in parallel and in communication with each other to enable VM 151 to remotely access barcode reader 112 over network 106. In one example embodiment, each of the processes 202A-C can process data transferred between barcode reader 112 and VM151 into packets or other appropriate data structures and transmit/receive packets between them. In order to conserve computing resources, if VM151 ceases to require access to barcode reader 112, peripheral device management module 116 can terminate processes 202A-C.

Figure 2C:
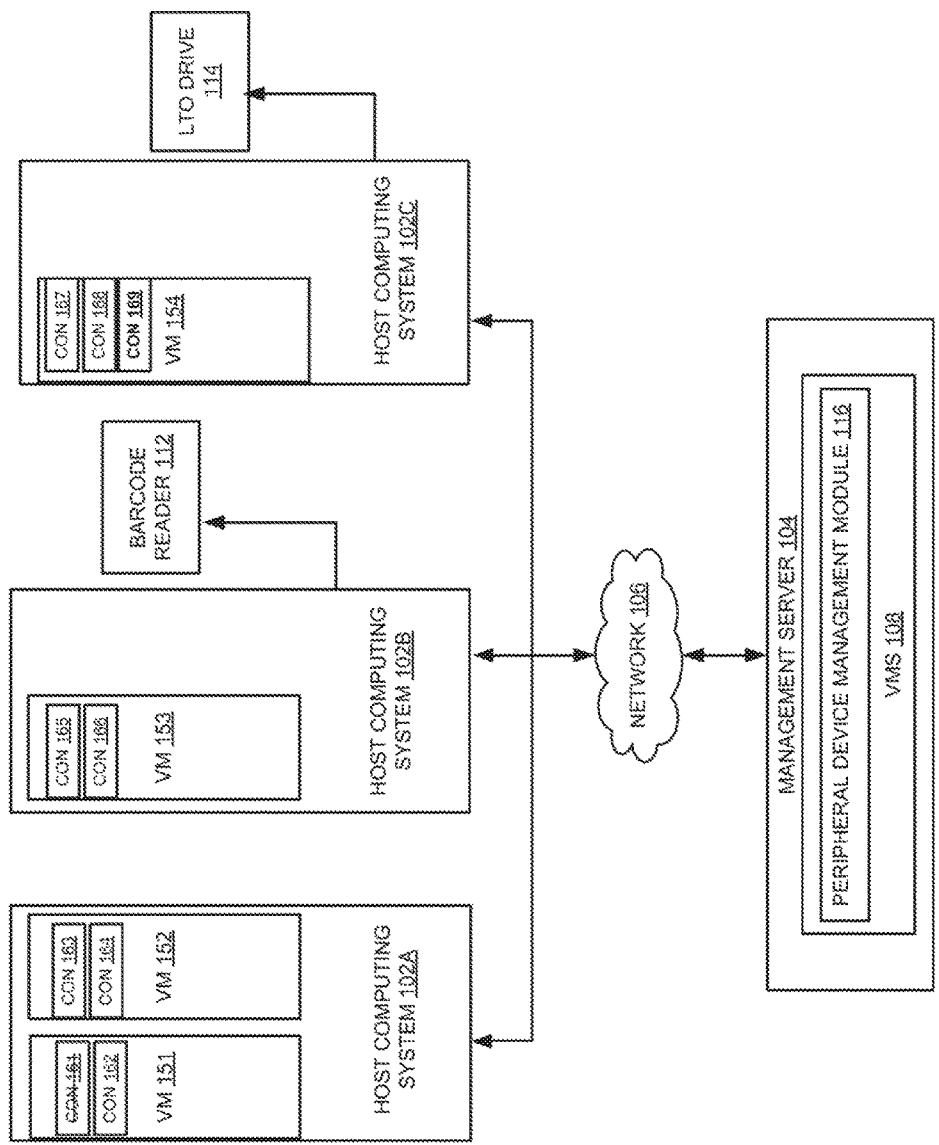
FIG. 2C is a conceptual diagram depicting another embodiment of a virtualized computing system.

In a further example shown in FIG. 2C, container 161 running on VM 151 on host computing system 102A requested access to LTO drive 114, which is connected to host computing system 102C. If container 161 is stateless, and in this example, it is assumed that container 161 is stateless, peripheral device management module 116 provisions a new container 169, equivalent to container 161, in virtual machine 154 running on host computing system 102C, while container 161 is stopped and de-provisioned. After the provisioning, container 169 is able to access LTO drive 114 directly.

Figure 3:
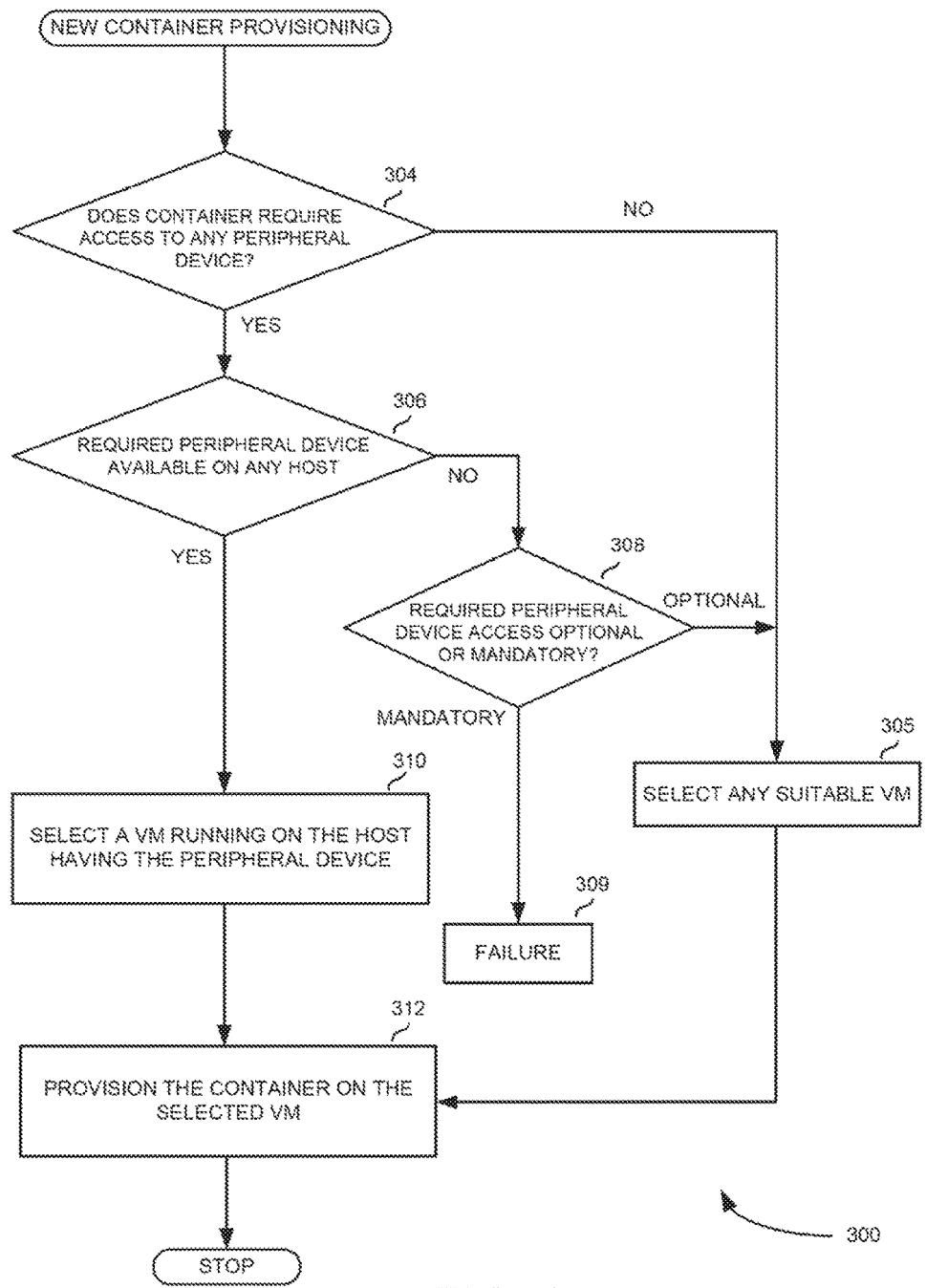
FIG. 3 is a flow diagram illustrating a method for connecting a container to a peripheral device connected to a different host computing system in a virtualized computing environment.

FIG. 3 is a flow diagram depicting an exemplary method for provisioning a container on a VM running on one of a plurality of host computing systems, wherein the host computing systems are configured as a cluster in a virtualized computing environment.

Referring to flow diagram 300 of FIG. 3, VMMS initiates a container provisioning process in response to a request, which may be made by an administrator or by the peripheral device management module 116 when a new container is needed in the example of FIG. 2C.

At step 304, the VMMS determines whether the container being provisioned requires access to a peripheral device. For example, the container being provisioned may require access to a barcode reader or a LTO drive.

At step 305, in response to determining that the container being provisioned requires no peripheral device, the VMMS can select any suitable VM within the cluster of host computing systems as the target site for container provisioning. The selection may be made based on availability of hardware resources, such as CPU and memory. The container is then provisioned on the selected VM at step 312.

At step 306, and in response to determining at step 304 that the container being provisioned requires access to a peripheral device, the VMMS performs a check to determine whether the required peripheral is available on any of the host computing systems in the cluster. This step can be performed, for example, by querying the peripheral device management module. If, upon performing the check at step 306, the required peripheral is not available, the VMMS performs another check at 308 to determine if the required peripheral device access is optional or mandatory. If mandatory, the new container provisioning fails at step 309. If optional, the flow proceeds to step 305, where the container provisioning is carried out on any suitable VM.

On the other hand, in response to determining that the requested peripheral device is available on one of the host computing systems in the cluster, the VMMS at step 310 selects a VM which is running on the host computing system having the peripheral device. If more than one VM is concurrently configured to run on the host computing system having the required peripheral device, the VMMS can choose any of them as appropriate. For example, the VMMS can provision the container on the VM having the desired operating system or on the VM having the smallest workload.

At step 312, the VMMS provisions the container on the VM selected at step 310 by configuring the container parameters and starting the container.

Figure 4:
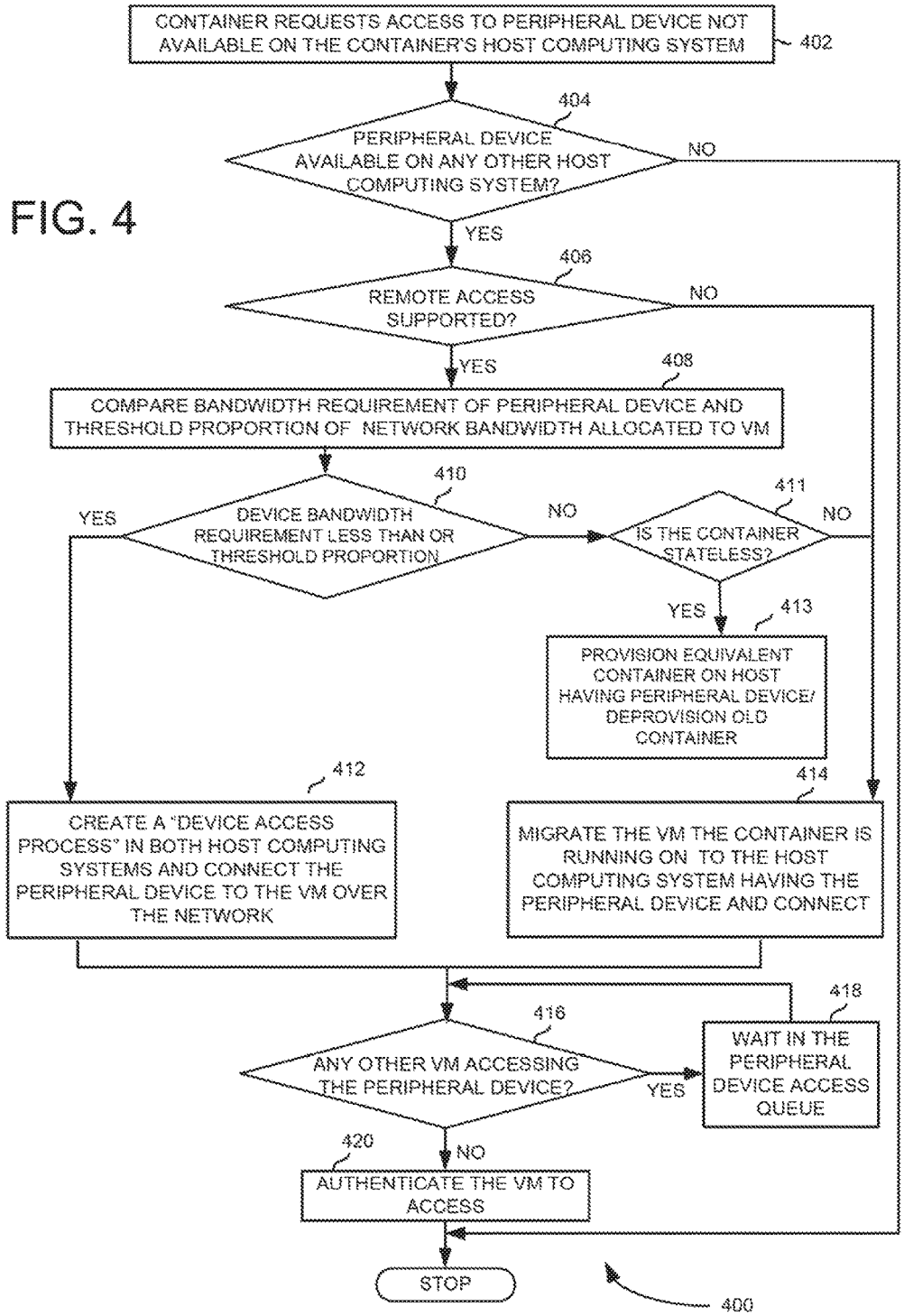
FIG. 4 is a flow diagram illustrating a method for connecting a container to a peripheral device connected to a different host computing system in a virtualized computing environment.

FIG. 4 is a flow diagram depicting an exemplary method for accessing a peripheral device connected to a second host computing system by a container running within a virtual machine connected to a first host computing system, wherein the host computing systems are configured as a virtualized computing environment.

At step 402, the peripheral device management module determines that a container has requested access to a peripheral device that is not available on the container's local host computing system. At step 404, the peripheral device management module determines whether the peripheral device is available on any other host computing system. For example, the determination can be made using a look-up table (e.g., look-up table 500 shown in FIG. 5) residing in the management server. If the peripheral device is not available on any other host computing system, then the process 400 is terminated.

At step 406 peripheral device management module determines whether the peripheral device supports remote access. If the peripheral device does not support remote access via the network, then the VMMS migrates the VM having the container to the host computing system having the peripheral device as depicted in FIG. 2A. The container is then able to connect to the peripheral device locally through the migrated VM at step 414.

At step 408, a bandwidth requirement of the peripheral device is compared with network bandwidth allocated to the VM. In an example embodiment, the bandwidth requirement of the peripheral device is determined by accessing a look-up table or by querying the peripheral device.

At step 410, a check is made to determine whether the bandwidth requirement of the peripheral device is less than or equal to a threshold percentage of network bandwidth allocated to the VM hosting the container based on the comparison.

At step 412, in response to determining that the bandwidth requirement of the peripheral device is less than a threshold percentage of network bandwidth allocated to the VM, the peripheral device management module enables the container to remotely access the peripheral device over the network. In one example embodiment depicted in FIG. 2B, the peripheral device management module creates a process in each of the first host computing system and the second host computing system to enable remote communication between the first host computing system and the second host computing system. Further, the peripheral device management module also creates a process within the VM in which the container is enclosed to remotely access the peripheral device by utilizing the connection between the first host computing system and the second host computing system. Each process performs an encapsulation and/or decapsulation of data transferred between the peripheral device and the VM. In one exemplary implementation, when the VM stops remotely accessing the peripheral device, then the peripheral device management module can terminate the processes. In this example embodiment, the VM is authenticated for remotely accessing the peripheral device and the VM is enabled to remotely access the peripheral device over the network upon authentication.

If remote access is not possible because the peripheral device management module determines that the bandwidth requirement of the peripheral device is greater than a threshold percentage of the network bandwidth allocated to the VM, the peripheral device management module performs another check at step 411. At step 411, the peripheral device management module determines if the requesting container is stateful or stateless by querying the container's configuration file. A stateful container is configured to persistently record data generated in one session for use in a later session. A stateless container, by contrast, is configured to not maintain any "state" and thus does not persistently record any data for use across sessions.

At step 413, upon determining that the requesting container is a stateless container, the peripheral device management module provides access to the peripheral device using the technique illustrated in FIG. 2C. That is, the peripheral device management module triggers a process to provision a new container equivalent to the requesting container within a VM that is running within the second host computing system (in accordance with the method 300), and the requesting container is stopped and de-provisioned. The newly provisioned container can then access the peripheral directly.

At step 414, upon determining that the requesting container is a stateful container, the VMMS migrates the VM enclosing the requesting container from the first host computing system to the second host computing system to enable local access to the peripheral device, as depicted in FIG. 2A. In an example embodiment, the VM running on the first host computing system is migrated to the second host computing system. Once the VM has been migrated, the container is able to connect to the peripheral device through the migrated VM in the first host computing system.

At step 416, the peripheral device management module determines whether any other container is currently utilizing/accessing the peripheral device. If any other containers are currently accessing the peripheral device, the request from the container is kept in an access queue associated with the peripheral device at step 418. The check at step 416 is carried out periodically after step 418. Eventually, if no other containers are accessing the peripheral device, the flow proceeds to step 420, where the container is authenticated by the host computing system having the peripheral device to enable the container to access the peripheral device.

Figure 5:
FIG. 5 is an exemplary lookup table showing peripheral devices and host computing systems.

FIG. 5 is an example lookup table 500 showing details associated with peripheral devices and VMs, such as device id 502 and the host the device is connected to 504. In the embodiments, table 500 is stored in management server 104 and used by the peripheral device management module in the manner described above. Particularly, FIG. 5 depicts a list of peripheral devices available in a datacenter, bandwidth requirement of each peripheral device, network bandwidth allocated to each host computing system, network bandwidth allocated to VMs and other information used by the processed depicted in FIGS. 3 and 4 in order to provision container access to peripheral devices.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method of provisioning access to a peripheral device for a container hosted by a virtual machine that is running in a first host computer, wherein the peripheral device is directly connected to a second host computer and the first and second host computers are connected over a network, comprising:
    determining a bandwidth requirement of the peripheral device;
    comparing the bandwidth requirement of the peripheral device to a threshold percentage of bandwidth allocated to the virtual machine that is hosting the container;
    if the bandwidth requirement of the peripheral device is higher than the threshold percentage of bandwidth allocated to the virtual machine that is hosting the container, migrating the virtual machine from the first host computer to the second host computer; and
    if the bandwidth requirement of the peripheral device is lower than or equal to the threshold percentage of bandwidth allocated to the virtual machine that is hosting the container, establishing a channel between the virtual machine and the virtualization software of the second computer, by which the container communicates with the peripheral device, wherein
    the channel between the virtual machine and the virtualization software of the second computer is established by launching a first process in the virtual machine, a second process in a virtualization software of the first host computer, and a third process in a virtualization software of the second computer, and
    the first, second, and third processes communicate over the network.

2. The method of claim 1, wherein the container is a stateful container.

3. The method of claim 1, wherein the determining a bandwidth requirement of the peripheral device comprises querying the device.

4. The method of claim 1, wherein the determining a bandwidth requirement of the peripheral device comprises looking up the bandwidth requirement in a table.

5. The method of claim 1, wherein the migrating the virtual machine from the first host computer to the second host computer is performed by a virtual machine management server.

6. The method of claim 1, wherein the comparing the bandwidth requirement of the peripheral device is performed by a peripheral device management module.

7. A method of provisioning access to a peripheral device for a first container hosted by a virtual machine that is running in a first host computer, wherein the peripheral device is directly connected to a second host computer and the first and second host computers are connected over a network, comprising:
    determining a bandwidth requirement of the peripheral device;
    comparing the bandwidth requirement of the peripheral device to a threshold percentage of bandwidth allocated to the virtual machine that is hosting the container;
    if the bandwidth requirement of the peripheral device is higher than the threshold percentage of bandwidth allocated to the virtual machine that is hosting the container, provisioning a second container that is identical to the first container in a virtual machine that is running in the second host computer and de-provisioning the first container; and
    if the bandwidth requirement of the peripheral device is lower than or equal to the threshold percentage of bandwidth allocated to the virtual machine that is hosting the container, establishing a channel between the virtual machine and the virtualization software of the second computer, by which the container communicates with the peripheral device, wherein the channel between the virtual machine and the virtualization software of the second computer is established by launching a first process in the virtual machine, a second process in a virtualization software of the first host computer, and a third process in a virtualization software of the second computer, and the first, second, and third processes communicate over the network.

8. The method of claim 7, wherein the container is a stateless container.

9. The method of claim 7, wherein the determining a bandwidth requirement of the peripheral device comprises querying the device.

10. The method of claim 7, wherein the determining a bandwidth requirement of the peripheral device comprises looking up the bandwidth requirement in a table.

11. The method of claim 7, wherein the migrating the virtual machine from the first host computer to the second host computer is performed by a virtual machine management server.

12. The method of claim 7, wherein the comparing the bandwidth requirement of the peripheral device is performed by a peripheral device management module.

13. A non-transitory computer readable medium containing program instructions for causing a computer to provision access to a peripheral device for a first container hosted by a virtual machine that is running in a first host computer, wherein the peripheral device is directly connected to a second host computer and the first and second host computers are connected over a network, the program instructions comprising the steps of:

determining a bandwidth requirement of the peripheral device;

comparing the bandwidth requirement of the peripheral device to a threshold percentage of bandwidth allocated to the virtual machine that is hosting the container;

if the bandwidth requirement of the peripheral device is higher than the threshold percentage of the bandwidth allocated to the virtual machine that is hosting the container, and the container is stateful, migrating the virtual machine from the first host computer to the second host computer;

if the bandwidth requirement of the peripheral device is higher than the threshold percentage of the bandwidth allocated to the virtual machine that is hosting the container, and the container is stateless, provisioning a second container that is identical to the first container in a virtual machine that is running in the second host computer and de-provisioning the first container;

if the bandwidth requirement of the peripheral device is lower than or equal to the threshold percentage of the bandwidth allocated to the virtual machine that is hosting the container, establishing a channel between the virtual machine and the virtualization software of the second computer, by which the container communicates with the peripheral device, wherein the channel between the virtual machine and the virtualization software of the second computer is established by launching a first process in the virtual machine, a second process in a virtualization software of the first host computer, and a third process in a virtualization software of the second computer, and the first, second, and third processes communicate over the network.

14. The non-transitory computer readable medium of claim 13, wherein the step of determining the bandwidth requirement of the peripheral device comprises querying the device.

15. The non-transitory computer readable medium of claim 13, wherein the step of determining the bandwidth requirement of the peripheral device comprises looking up the bandwidth requirement in a table.

16. The non-transitory computer readable medium of claim 13, wherein the step of migrating the virtual machine from the first host computer to the second host computer is performed by a virtual machine management server.

17. The non-transitory computer readable medium of claim 13, wherein the step of comparing the bandwidth requirement of the peripheral device is performed by a peripheral device management module.

* * * * *